Feb. 26, 1963 A. G. BUTLER 3,078,818
METHOD OF COMPENSATING FOR THE EFFECT OF
CAMBERED STRIP STOCK IN MAKING
HELICAL SEAM METAL TUBING
Filed April 19, 1960
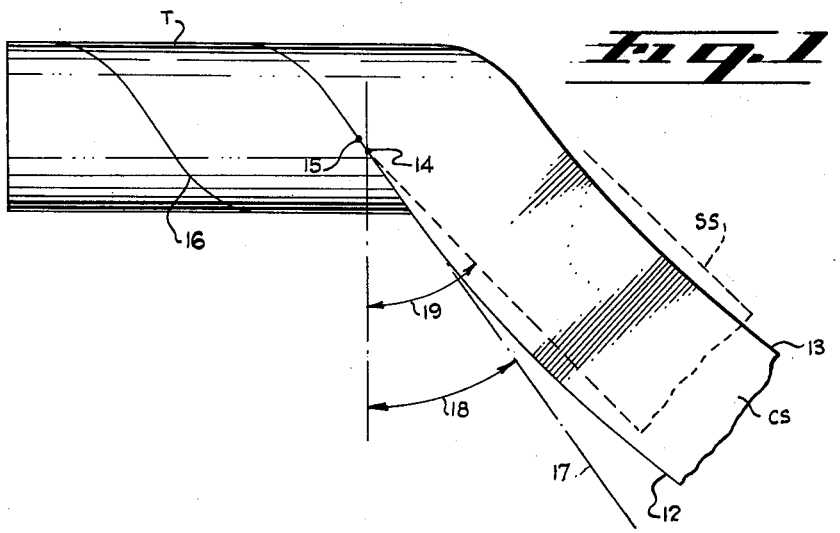
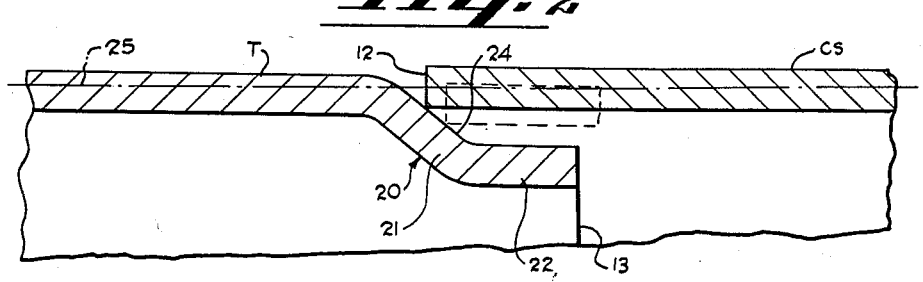
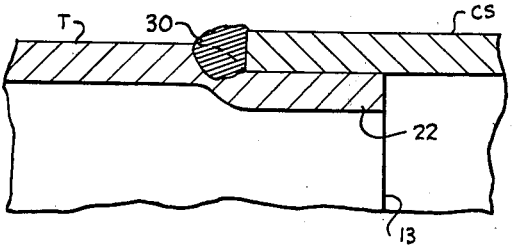
INVENTOR.
Adolf G. Butler
BY
*Moran & Graham*
ATTORNEYS

United States Patent Office

3,078,818
Patented Feb. 26, 1963

3,078,818
METHOD OF COMPENSATING FOR THE EFFECT OF CAMBERED STRIP STOCK IN MAKING HELICAL SEAM METAL TUBING
Adolf G. Butler, Downey, Calif., assignor to American Pipe and Construction Co., South Gate, Calif., a corporation of Delaware
Filed Apr. 19, 1960, Ser. No. 23,262
1 Claim. (Cl. 113—35)

This invention has to do with the making of welded, helical seam, metal tubing from strip metal wherein the strip is wound helically to form a tube and the edges welded.

A major problem in the making of tubing from strip is the fact that the strip itself has a varying amount of longitudinal curvature (within specified tolerances), it being uneconomical to provide absolutely straight-edge strip stock for the manufacture of many types of tubing. The longitudinal curvature, referred to as camber, may vary in amount and direction along the length of the strip.

It is obvious that if cambered strip is rolled helically into tubular form and butt-welded at the seams, the resulting tube will not be cylindrical, since the longitudinal curvature of the strip would result in the short side thereof being welded to the long side to produce a tube having a progressively increasing or decreasing diameter depending upon the direction of curvature, the tube itself being conoidal. Various methods have been resorted to for the purpose of overcoming this difficulty, but so far as I know, all such methods that have been tried heretofore have proved difficult to carry out, especially where heavy gauge steel is employed, and have not proved entirely successful.

An object of the invention is to provide a new and improved method of forming tubing having a welded, helically disposed seam utilizing strip stock having longitudinal curvature which enables the strip stock to be readily aligned and welded at the seam to be formed to produce an improved generally cylindrical tube.

A further object is to provide a method of making tubing from strip stock which involves so forming one of the edges to be welded as to provide a sloping surface against which the other edge of the strip can abut and remain in contact as it is adjusted radially and laterally to accommodate for its curved shape.

Another object is to provide a simple method of the type indicated which can be readily carried out.

Still another object is to provide an improved tubing having a novel seam construction.

These and other objects will be apparent from the drawing and the following description. Referring to the drawing:

FIG. 1 is a diagrammatic plan view illustrating the forming of a generally cylindrical tube by feeding strip stock longitudinally, forming it into a helical path, and welding the seams;

FIG. 2 is a sectional view somewhat diagrammatic in character through the seam area slightly ahead of the welding point showing the nature of the improved sloped shoulder used in the method; and FIG. 3 is a view similar to FIG. 2 but showing the completed seam in a region past the welding point.

More particularly describing the invention, in the manufacture of helical seam welded tubing or pipe, the strip stock is fed longitudinally and then caused to take a helical path to form a tube of the required diameter with the adjacent edges of the strip being welded to form the helical seam. In FIG. 1, the letter T generally designates the tubing being formed and the letters CS designate the cambered strip stock. If the strip is perfectly straight, such as depicted in broken lines in FIG. 1 and designated SS, the problem of forming and welding the strip to form a cylindrical tube is purely a mechanical one and does not offer any unusual problem, since the helix angle of the incoming strip, designated 19, remains constant. However, where cambered strip is used, as in perhaps the majority of cases, the helix angle cannot be maintained constant. Furthermore there is the problem of causing the edges of the strip to meet at the intended welding point, since the edges will be offset radially. To overcome these difficulties, I provide one of the edges of the strip, preferably the edge which is to become the rear edge of the tube being formed, with a sloping shoulder against which to adjustably position and abut the other edge of the strip for welding. Also, I prefer to provide a section beyond the sloping shoulder adapted to underlie the other edge and act as an integral backup band or bar during the welding process, as will later appear. The sloping shoulder should be formed at an angle such that, irrespective of the adjustments made in the helix angle of the incoming strip and irrespective of the radial offset of the two edges to be welded at the region of the seam, the incoming edge of the strip will ride against the shoulder in position to be welded, and form a modified buttweld.

Referring now more particularly to the drawings, which are diagrammatic in character, it is contemplated that conventional means be used for supporting the tube T as it is formed and for permitting it to rotate and advance. Also, conventional means can be used to advance the strip at the desired helix angle and to cause it to take the required helical path for the particular tubing being fabricated.

In the drawing I show the longitudinally curved or cambered strip, designated CS, with the longitudinal curvature thereof exaggerated for the purpose of illustration. Numeral 12 indicates what will be termed the leading or front edge of the strip and numeral 13, the trailing or rear edge thereof. The former is shown passing through a point 14 on the tube which is to be considered the point at which the incoming front edge 12 meets the rear edge 13 of the last convolution of the strip which now forms the end portion of partially completed tube T. The two edges are welded together at a point 15 to form a seam 16. Numeral 17 designates a line which is tangential to the convex front edge 12 of the strip CS at the meeting point 14. Thus the angle 18 may be taken to represent the true or correct helix angle for a strip having a convex front edge as shown, as distinguished from the apparent helix angle 19 which would be correct for a straight strip SS.

Referring now to FIG. 2, I show a portion of the tube being made and this is shown as having an offset marginal portion 20 comprising a conoidal or sloping helical ring or wall 21 and a terminal section 22 therebeyond. The strip CS can be run through forming rolls (not shown) prior to being welded to form the offset portion 20. The wall 21 provides the sloping shoulder or outer surface 24 against which the leading or front edge 12 of the cambered strip is adjustably positioned. The broken line 25 may be taken as being parallel to the axis of the tube being formed and thus would represent the outline of a true cylinder. From this it will be apparent that, due to the camber in the strip block, on any radial plane extending axially of the tube being formed, each section of the tubing between seams is tapered or conoidal. Thus to make a generally (but not truly) cylindrical tube with the given cambered strip, it is necessary to adjust the leading or front edge 12 both radially of a true cylinder (line 25) and axially of the tube T (by changing the helix angle). If the limits of the camber are known the angle of the sloping shoulder 24 can be calculated so that edge 12 will always abut the shoulder even though the helix angle is changed. Also, the length of the shoulder can be calculated for the maximum movement of the leading edge 12. It will be apparent, then, that the shoulder 24 serves as a variable diameter helical adjusting ring to match the slightly different diameters of the edges to be welded, the cambered strip forming, when welded into a tube, a continuous helical frustum.

In order to more clearly set forth the method, as an example it may be assumed that the strip or skelp has a maximum camber of 1 inch in 20 feet; that the strip is 48 inches wide; and that a tube having an outside diameter of 37½ inches is to be formed. When the strip is cambered as shown in the drawing, the real helix angle is less than the apparent theoretical angle for straight-sided strip. Thus, inasmuch as the tube tends to be slightly conoidal in shape, if the minimum diameter remains the same then the mean diameter must increase. The diameter of the long edge of the strip will increase in the same proportion and will cause an increased lap as well as increased diameter.

Then:

37½″ dia. cyl.=117.8″ circumference. Using 48″ wide strip with a length difference in its edges of 0.007″ per inch: let $\theta$ represent helix angle $$\sin \theta = \frac{48.0}{117.8} = 0.40747$$

$$\theta = 24°2.8'$$

$$\text{Spiral length} = \frac{117.8}{\cos. \text{ of } \theta} = \frac{117.8}{.91323} = 129.00''$$

Length difference per convolution between long and short edges of strip=0.007″ (per in.) ×129=.903″

$$\Delta = \frac{117.8 \times 0.007}{2\pi} = \frac{0.8246}{2\pi} = 0.131''$$

This difference in diameter is directly proportional to the diameter of the tube.

There are three variables encountered in forming the helical seam tubing. These are illustrated in the basic equation $$\tan \theta = \frac{L}{\pi D}$$

involving the lead, wherein $\theta$=helix angle
$L$=lead or distance between points measured along axis of tubing
$D$=diameter of the tubing.

Because the circumference of a transverse section of a cylinder made of cambered skelp is a function of the average diameter of the cone, the relationship of the equation, above must be corrected for this condition.

In order to hold the minimum diameter constant it will be necessary to alter all three factors in the relationship demonstrated below.

$C$=Circumference of base pipe.
$\Delta$=Change in diameter of plain edge.
$(C+\Delta\pi)$=Average circumference of cone.

Then:

The change in lead=$(C+\Delta\pi) \tan (\theta-\Delta\theta) - \pi D \tan \theta$ Then:

(117.8+0.131π) tan (24°2.8′−0°0.50′)
=118.2×0.44603=52.721 in.
117.8×tan 24°2.8′ 117.08×0.44620 =52.562 in.
─────────
0.159 in.

(In above equation 0°0.50′ represents decrease in helix angle for maximum camber.)

$$\text{Slope} = \frac{0.131}{0.159} = 0.825$$

$\theta$=39½° (helix angle)

It is apparent from the above, therefore, that under the conditions given, the angle of the sloping shoulder 24 with respect to the axis of the tube is calculable for any given size of tubing and width of strip having camber of known limits. The above calculations are based upon the assumption that the leading or front edge is convex as shown. Thus, the shoulder 24 should be made long enough to allow for axial migration of the edge 12 in response to adjustments in the helix angle for a concave leading edge.

As previously indicated, in FIG. 2 the seam has been shown prior to welding but the parts may be assumed to be positioned for welding at the welding point. In this connection it is to be understood that the incoming strip stock is substantially tangential to the periphery of the tube being formed. During the welding operation, the terminal section 22 of the offset marginal edge portion 20 becomes a backing strip for what is in effect a backed buttweld. This is apparent from FIG. 3 wherein the portion 22 has been shown flattened against the inside of the tubing being formed in the completed seam. In practice it has been found that section 21 becomes sufficiently hot just ahead of the welding point to permit it being bent to the position of FIG. 3 by a roller (not shown). Numeral 30 designates the weld. The flattening of the portion 22 and the guiding, forming and holding of the strip and tubing can be accomplished by conventional rollers, mandrels and guides known in the art.

While I have shown and described a preferred embodiment of the invention I contemplate that various changes and modifications can be made without departing from the scope of the invention as set forth in the claim which follows. For example, the rear or trailing edge of the strip has been shown provided with the offset marginal portion 20 with the sloping ring 21, however, this could be formed on the leading edge portion instead, although this might make it more difficult to maintain the proper helix angle.

I claim:

The method of compensating for the effect of cambered strip in making generally cylindrical metal tubing of a given diameter wherein the strip is advanced longitudinally and formed into a helix and the edges are welded together progressively to form a helical seam, which includes the steps of forming the rear marginal edge portion of the strip to provide a sloping shoulder and a flat, terminal marginal section therebeyond, advancing the strip longitudinally to the partially completed tubing and, in doing so, adjusting the helix angle thereof as required by the camber of the strip to cause the near edge of the strip to engage said sloping shoulder at a given meeting point, welding the near edge to said shoulder, and bending said terminal edge section into engagement with the underside of said near edge of said strip.

References Cited in the file of this patent

UNITED STATES PATENTS

| | | |
|---|---|---|
| 1,929,415 | Force | Oct. 10, 1933 |
| 2,216,606 | Taylor | Oct. 1, 1940 |

FOREIGN PATENTS

| | | |
|---|---|---|
| 1,197,896 | France | June 8, 1959 |
| 308,419 | Great Britain | Mar. 28, 1929 |
| 683,966 | Great Britain | Dec. 10, 1952 |